(12) United States Patent
Sakata et al.

(10) Patent No.: US 8,787,833 B2
(45) Date of Patent: Jul. 22, 2014

(54) RADIO COMMUNICATION METHOD AND SYSTEM

(75) Inventors: Masayuki Sakata, Tokyo (JP); Hiroaki Aminaka, Tokyo (JP)

(73) Assignee: NEC Corporation, Tokyo (JP)

(*) Notice: Subject to any disclaimer, the term of this patent is extended or adjusted under 35 U.S.C. 154(b) by 117 days.

(21) Appl. No.: 12/920,783

(22) PCT Filed: Mar. 4, 2009

(86) PCT No.: PCT/JP2009/054052
§ 371 (c)(1),
(2), (4) Date: Sep. 2, 2010

(87) PCT Pub. No.: WO2009/110500
PCT Pub. Date: Sep. 11, 2009

(65) Prior Publication Data
US 2011/0014876 A1    Jan. 20, 2011

(30) Foreign Application Priority Data
Mar. 7, 2008  (JP) .................... 2008-057706

(51) Int. Cl.
*H04B 15/00* (2006.01)
(52) U.S. Cl.
USPC ............... 455/62; 455/68; 455/63.3; 370/329
(58) Field of Classification Search
USPC .................... 455/62, 552.1; 370/329, 338
See application file for complete search history.

(56) References Cited

U.S. PATENT DOCUMENTS

| 7,573,857 | B1* | 8/2009 | Radhakrishnan et al. ..... 370/338 |
| 7,797,018 | B2* | 9/2010 | Chandra .................... 455/552.1 |
| 8,139,672 | B2* | 3/2012 | Gore et al. .................... 375/295 |
| 2006/0223574 | A1* | 10/2006 | Chandra .................... 455/552.1 |
| 2010/0135238 | A1* | 6/2010 | Sadri et al. .................... 370/329 |
| 2010/0330914 | A1* | 12/2010 | Chandra .......................... 455/62 |
| 2011/0280211 | A1* | 11/2011 | Zhang et al. .................. 370/329 |

FOREIGN PATENT DOCUMENTS

| JP | 2000269938 A | 9/2000 |
| JP | 2003203292 A | 7/2003 |
| JP | 2004221812 A | 8/2004 |
| JP | 2004-357180 A | 12/2004 |
| JP | 2007300192 A | 11/2007 |

OTHER PUBLICATIONS

International Search Report for PCT/JP2009/054052 mailed May 19, 2009.
Japanese Office Action for JP Application No. 2012-196227 mailed on Sep. 10, 2013 with Partial English Translation.

* cited by examiner

*Primary Examiner* — Fayyaz Alam
*Assistant Examiner* — Mohammed Rachedine
(74) *Attorney, Agent, or Firm* — Sughrue Mion, PLLC

(57) ABSTRACT

The first communication apparatus transmits existence confirmation request notices to the second communication apparatus, using the first frequency band and the second frequency band that is a frequency band different from the first frequency band. The second communication apparatus returns existence confirmation response notices as a response to the correctly received existence confirmation request notices of the first frequency band and the second frequency band, to the first communication apparatus, using the frequency bands corresponding to the first frequency band and the second frequency band. The first communication apparatus, after having received one or more of the existence confirmation response notices transmitted from the second communication apparatus, exchanges data with the second communication apparatus, using the frequency band that corresponds to the existence confirmation response notice transmitted through the higher frequency band among the first and second frequency bands.

8 Claims, 7 Drawing Sheets

RADIO COMMUNICATION METHOD AND SYSTEM

This application is the National Phase of PCT/JP2009/054052, filed Mar. 4, 2009, which claims priority based on Japanese Patent Application No. 2008-0577066 filed Mar. 7, 2008, the disclosure of which is incorporated herein by reference in its entirety.

TECHNICAL FIELD

The present invention relates to a radio communication method and system that are preferably used for ITS (Intelligent Transport Systems).

BACKGROUND ART

In ITS, systems that provide information available for avoiding accidents such as early discovery of an oncoming car on a road with poor visibility, rapid notice that a car is entering a blind crossing, and the like, have been investigated. As a means for realizing such a system, a configuration in which a terminal apparatus capable of performing radio communication is set on each car so that data such as the position, speed, etc. of each car is notified to others by means of the terminal apparatuses, can be considered.

At present, in Japan, two frequency bands, namely 5.8 GHz band and 700 MHz band have been studied as the radio frequencies for ITS. As to the apparatuses for dedicated short-range communications (DSRC: Dedicated Short-Range Communication) to be used for ITS, proposals have been presented by Japanese Laid-Open Patent Application No. 2003-203292A and others, for example.

Typically, when the frequency band used for radio communication is low, the number of links available for communications in that frequency band decreases. On the other hand, since cars that are equipped with a terminal apparatus for ITS will tend to increase in number, it is preferable that usage efficiency of the frequency band be improved so as to offer the communication service to a greater number of ITS users.

Radio waves of a relatively high frequency band of about a few gigahertz travels in a highly straight direction and have greater decay rates in space. Therefore, if such radio waves in the high frequency band are used for radio communication, it is difficult to establish communication with a terminal apparatus that is set in a car that is located far away from the subject car, or a terminal apparatus that is set in a car that is located at a range invisible to the subject car, i.e., at a position blocked by buildings or the like, for example.

In contrast to this, radio waves of a relatively low frequency band of about some hundreds of megahertz have smaller decay rates in space and present a large ratio of diffraction. Accordingly, if radio waves in such a low-frequency band are used for radio communication, it is even possible to establish communication with a terminal apparatus that is set on a car that is not visible to the subject car. However, if radio waves of low frequency bands are used for radio communication, the communication area becomes wider so that the number of communicable terminal apparatuses increases. As a result, the subject car will communicate with not only oncoming traffic on the aforementioned road with poor visibility or incoming cars entering a blind crossing, but also with the terminal apparatuses set on the cars other than these. Accordingly, a greater amount of information than is necessary is given to the user of the ITS.

SUMMARY

It is therefore an object of the present invention to provide a radio communication method and radio communication system that can provide communication services for a greater number of users by improving the usage efficiency of frequency bands.

In order to achieve the above-described object, a radio communication method in the exemplary aspect of the present invention is a radio communication method for transmitting and receiving data between at least two communication apparatuses capable of performing radio communication, wherein the first communication apparatus transmits existence confirmation request notices to the second communication apparatus, separately using the first frequency band and the second frequency band that is a frequency band different from the first frequency band, the second communication apparatus returns existence confirmation response notices as a response to the correctly received existence confirmation request notices of the first frequency band and the second frequency band, to the first communication apparatus, using the frequency bands corresponding to the first frequency band and the second frequency band, and, the first communication apparatus, when having received one or more of the existence confirmation response notices transmitted from the second communication apparatus, exchanges data with the second communication apparatus, using the frequency band that corresponds to the existence confirmation response notice transmitted through the higher frequency band among the first and second frequency bands.

On the other hand, the radio communication system in the exemplary aspect of the present invention is a radio communication system for transmitting and receiving data between at least two communication apparatuses capable of performing radio communication, comprising:

a first communication apparatus that transmits existence confirmation request notices, separately using the first frequency band and the second frequency band that is a frequency band different from the first frequency band and that, when having received one or more of the existence confirmation response notices that respond to the existence confirmation request notices of the first frequency band and the second frequency band, transmits and receives data, using the frequency band corresponding to the higher frequency band of the first and second frequency bands; and, a second communication apparatus that, when having correctly received one or more of the existence request notices of the first frequency band and the second frequency band, returns existence confirmation response notices in response to the correctly received existence confirmation request notices, to the first communication apparatus, using the frequencies corresponding to the first frequency band and the second frequency band.

EXEMPLARY EMBODIMENT

Next, the present invention will be described using the drawings.

The First Exemplary Embodiment

In the radio communication system of the present invention, radio waves of different frequencies, belonging to at least two kinds of frequency bands are used to perform radio communication with the other party (terminal apparatus).

In the first exemplary embodiment, the subject performs communication with another party (terminal apparatus), both are visible to each other, using the relatively high frequency band radio wave which travels in a highly straight direction and also performs communication with another party, which cannot be seen by each other, using the relatively low frequency band radio wave which presents a high ratio of diffraction. Each terminal apparatus is set on a car, for example, to exchange data such as position, speed, etc., with each other.

Though the description hereinafter will be described taking an example where the 5.8 GHz band is used as the higher frequency band and the 700 MHz band is used as the lower frequency band, the present invention should not be limited to these frequency bands. That is, the first frequency band may employ any frequency band as long as it is a relatively high frequency band traveling in a highly straight direction while the second frequency band may employ any frequency band as long as it is a relatively low frequency band presenting a large ratio of diffraction.

Further, though the following description will be described taking an example where terminal apparatuses perform communication with each other using radio waves belonging to two kinds of frequency bands, the terminal apparatuses may be of a configuration that performs communication using radio waves belonging to three or more kinds of frequency bands as long as the terminal apparatuses at least include a configuration which performs communication using radio waves of the aforementioned first frequency band and the second frequency band.

Figure 1:
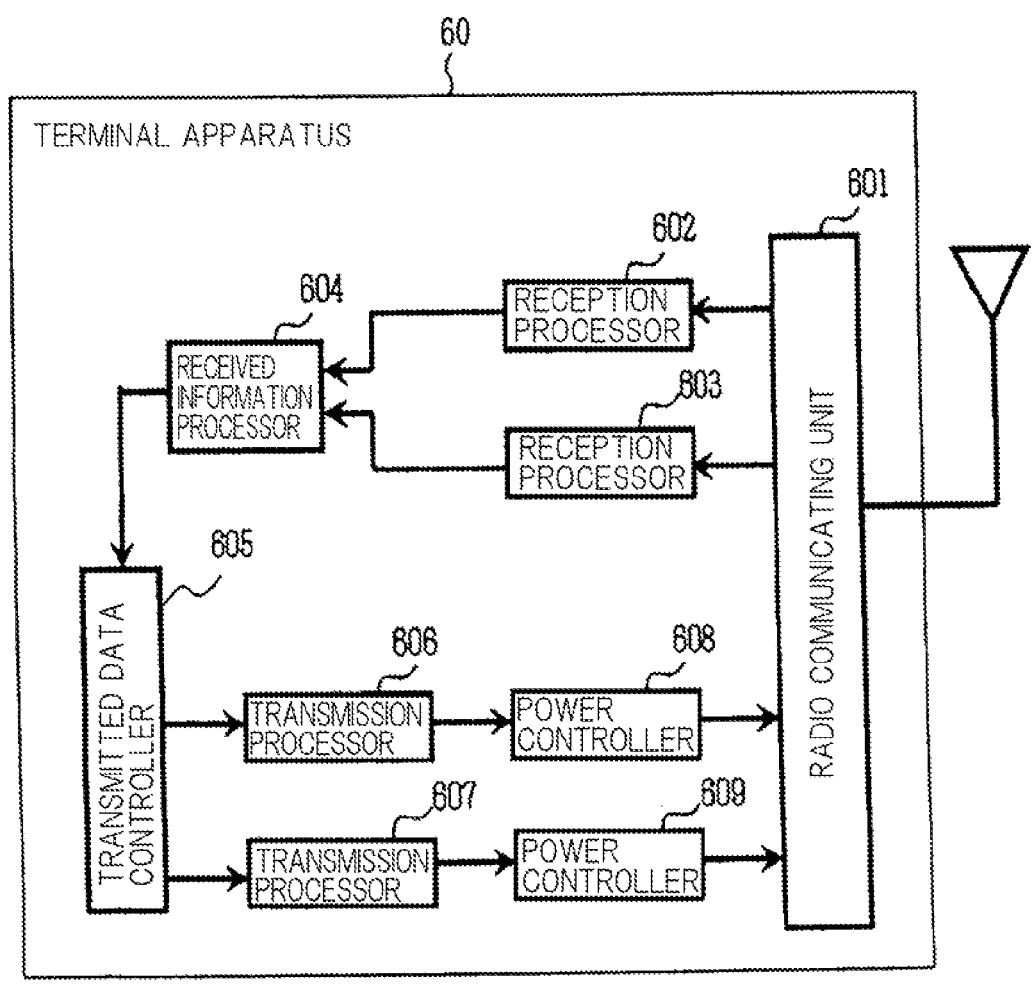
FIG. 1 is a block diagram showing a configurational example of a terminal apparatus provided for a radio communication system according to the first exemplary embodiment.

FIG. 1 is a block diagram showing one configurational example of a terminal apparatus provided for the radio communication system of the first exemplary embodiment.

As shown in FIG. 1, terminal apparatus 60 of the present exemplary embodiment includes radio communicating unit 601, two reception processors 602 and 603, received information processor 604, transmitted data controller 605, two transmission processors 606 and 607 and two power controllers 608 and 609.

Radio communicating unit 601 receives radio signals of the first frequency band (5.8 GHz) and the second frequency band (700 MHz) and outputs the radio signal of the first frequency band to reception processor 602 and outputs the radio signal of the second frequency band to reception processor 603.

Reception processors 602 and 603 down-convert the frequencies of the radio signals from radio communicating unit 601 and execute demodulation processes and decoding processes in association with the predetermined radio schemes. Reception processors 602 and 603 further output the decoded received data to received information processor 604.

Received information processor 604 selects the frequency band to be used for radio communication afterwards in accordance with the frequency band(s) of the radio signal(s) received at radio communicating unit 601. Specifically, when radio signals of both the first frequency band (5.8 GHz) and the second frequency band (700 MHz) are received, the first frequency band is selected. When the radio signal of the second frequency band alone is received, the second frequency band is selected.

Transmitted data controller 605, in accordance with the frequency band selected at received information processor 604, outputs the transmitted data to transmission processor 606 when the first frequency band is used for radio communication, and outputs the transmitted data to transmission processor 607 when the second frequency band is used.

Transmission processors 606 and 607 up-convert the frequencies of the transmitted data received from transmitted data controller 605 to execute coding processes and modulating processes in association with the predetermined radio schemes. The transmission processors output the modulated radio signals to power controllers 608 and 609.

Power controllers 608 and 609 amplify the radio signals received from transmission processors 606 and 607, to the necessary power and output the signals to radio communicating unit 601.

Radio communicating unit 601 transmits the radio signals received from power controllers 608 and 609.

Figure 2:
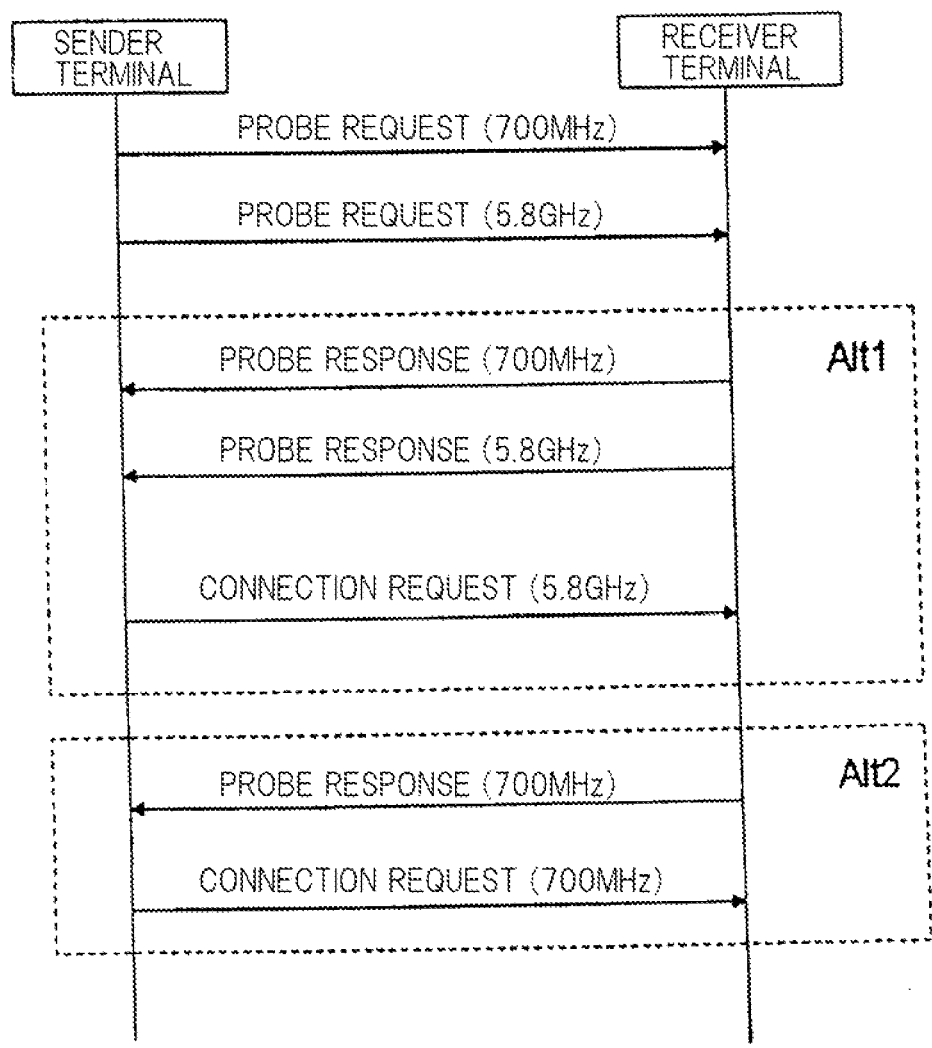
FIG. 2 is a sequence diagram showing a processing sequence of a radio communication system of the first exemplary embodiment.

FIG. 2 is a sequence diagram showing a processing sequence of the radio communication system of the first exemplary embodiment. Here, in FIG. 2, the radio communication using the first frequency band (5.8 GHz) is added with a postscript of (5.8 GHz) and the radio communication using the second frequency band (700 MHz) is added with a postscript of (700 MHz) to distinguish between the two.

Hereinbelow, the processing sequence (radio communication method) of the radio communication system of the present exemplary embodiment will be described by defining the terminal apparatus of the sender that wants to get into communication as the sender terminal (the first terminal apparatus) and defining the terminal apparatus that the sender terminal communicates with as the receiver terminal (the second terminal apparatus). Terminal apparatus 60 shown in FIG. 1 has a configuration which includes the functions of the sender terminal and the receiver terminal shown hereinbelow.

As shown in FIG. 2, the sender terminal transmits two probe requests (existence confirmation request notices) using the first frequency band (5.8 GHz) and the second frequency band (700 MHz). A probe request is a notice to be used for confirming the presence or absence of a terminal apparatus with which the subject communicates. The terminal apparatus that has received the probe request and that becomes the communication partner (which will be referred to hereinbelow as the receiver terminal) returns a probe response (existence confirmation response notice) for notifying the sender terminal of the probe request of the existence thereof. The sender terminal that has received the probe response transmits to the receiver terminal a connection request for establishing a link for radio communication with the receiver terminal.

Here, when the car that is equipped with the receiver terminal can be viewed from the car that is equipped with the sender terminal, the receiver terminal can receive both the probe requests transmitted through the first frequency band and the second frequency band. In this case, the receiver terminal transfers to the Alt1 procedure shown in FIG. 2 so as to return two probe responses to the sender terminal through the first frequency band and the second frequency band.

When receiving both the probe responses of the first frequency band and the second frequency band, the sender terminal selects the first frequency band (5.8 GHz) as the frequency band through which the sender terminal communicates with the receiver terminal, and transmits a connection request to the receiver terminal through the first frequency band. Thereafter, the sender terminal establishes a link with the receiver terminal through the first frequency band by a well-known sequence.

On the other hand, when the car that is equipped with the receiver terminal is invisible from the car that is equipped with the sender terminal, the receiver terminal can receive the probe request transmitted through the second frequency band (700 MHz) alone. In this case, the receiver terminal transfers to the Alt2 procedure shown in FIG. 2 so as to return a probe response to the sender terminal through the second frequency band.

When receiving the probe response of the second frequency band, the sender terminal selects the second frequency band as the frequency band through which the sender terminal communicates with the receiver terminal, and transmits a connection request to the receiver terminal through the second frequency band. Thereafter, the sender terminal establishes a link with the receiver terminal through the second frequency band by the well-known sequence.

According to the present exemplary embodiment, since communication between communication parties (terminal apparatuses) that are visible from each other is performed using the radio wave of a relatively high frequency band traveling in a highly straight direction and communication between communication parties (terminal apparatuses) that are invisible from each other is performed using the radio wave of a relatively low frequency band presenting a large ratio of diffraction, usage efficiency of the frequency bands is improved. Therefore, it is possible to provide the communication service to a greater number of ITS users.

Figure 3:
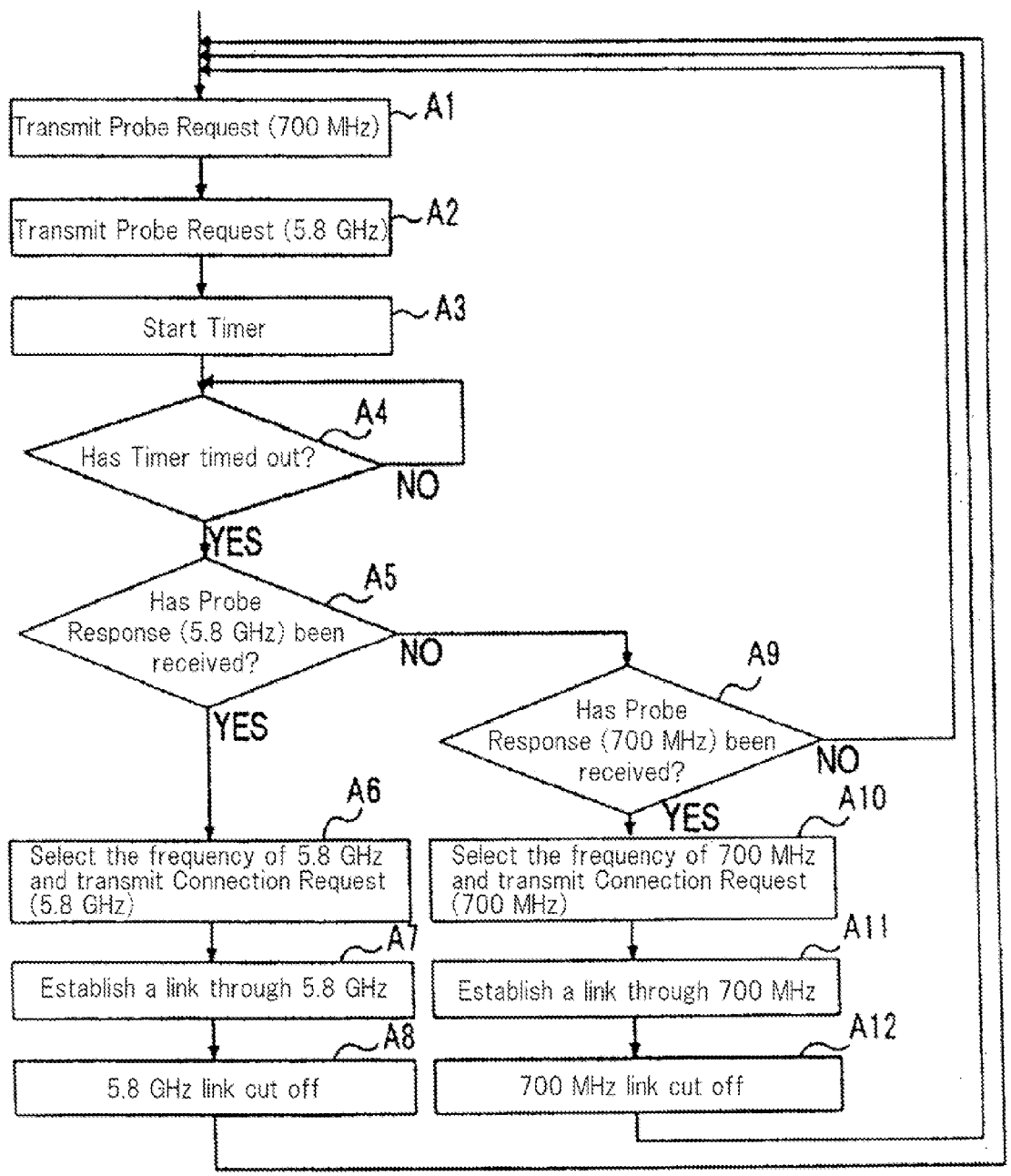
FIG. 3 is a flow chart showing the processing sequence of a sender terminal shown in FIG. 2.

FIG. 3 is a flow chart showing the processing sequence of the sender terminal shown in FIG. 2. In FIG. 3, the radio communication through the first frequency band (5.8 GHz) is added with a postscript of (5.8 GHz) and the radio communication through the second frequency band (700 MHz) is added with a postscript of (700 MHz) to distinguish between the two. Similarly, also in the processes shown in FIGS. 4 to 7 hereinbelow, the radio communication through the first frequency band (5.8 GHz) is added with a postscript of (5.8 GHz) and the radio communication through the second frequency band (700 MHz) is added with a postscript of (700 MHz) to distinguish between the two.

When a link with the receiver terminal is established, the sender terminal transmits a probe request using the second frequency band (700 MHz) first (Step A1), and then transmits a probe request using the first frequency band (5.8 GHz) (Step A2).

The sender terminal, when transmitting the probe request, starts a timer for a predetermined constant time, to be used for measurement of time until the determining process of the reception for a probe response is executed (Step A3).

Next, the sender terminal determines whether the timer has timed out (Step A4) and waits until the timer times out. When the timer times out, the sender terminal determines whether a probe response of the first frequency band has been received (Step A5).

When having received a probe response of the first frequency band, the sender terminal selects the first frequency band as the frequency band to be used for communication with the receiver terminal and transmits a connection request using the first frequency band (Step A6).

Thereafter, the sender terminal establishes the link with the receiver terminal using the first frequency band (Step A7). When the link is cut off (Step A8), the control returns to Step A1 and repeats the same procedures.

When receiving no probe response of the first frequency band at Step A5, the sender terminal determines whether a probe response of the second frequency band has been received (Step A9). When no probe response of the second frequency has been received, the control returns to Step A1 and repeats the same procedures.

When having received a probe response of the second frequency band, the sender terminal selects the second frequency band as the frequency band to be used for communication with the receiver terminal and transmits a connection request using the second frequency band (Step A10).

Thereafter, the sender terminal establishes the link with the receiver terminal using the second frequency band (Step A11). When the link is cut off (Step A12), the control returns to Step A1 and repeats the same procedures.

In the processing sequence shown in FIG. 3, if the sender terminal receives neither the probe response of the first frequency band (5.8 GHz) nor the probe response of the second frequency band (700 MHz), the sender terminal transmits probe requests through the two frequency bands, once again. These procedures are repeated for the predetermined number of times, and if neither of the probe responses of the two frequency bands can be received, the sender terminal decides that the condition of the sender terminal is such that it cannot communicate with the receiver terminal.

When the link that was once established using the radio wave of the first frequency band or the second frequency band is cut off, the same processing sequence is repeated to try to establish a link once again. Accordingly, even if the car that is equipped with the receiver terminal having communicated using the first frequency band (5.8 GHz), moves to an area in which the car equipped with the sender terminal is invisible, it is possible to establish a link once again using the second frequency band.

Figure 4:
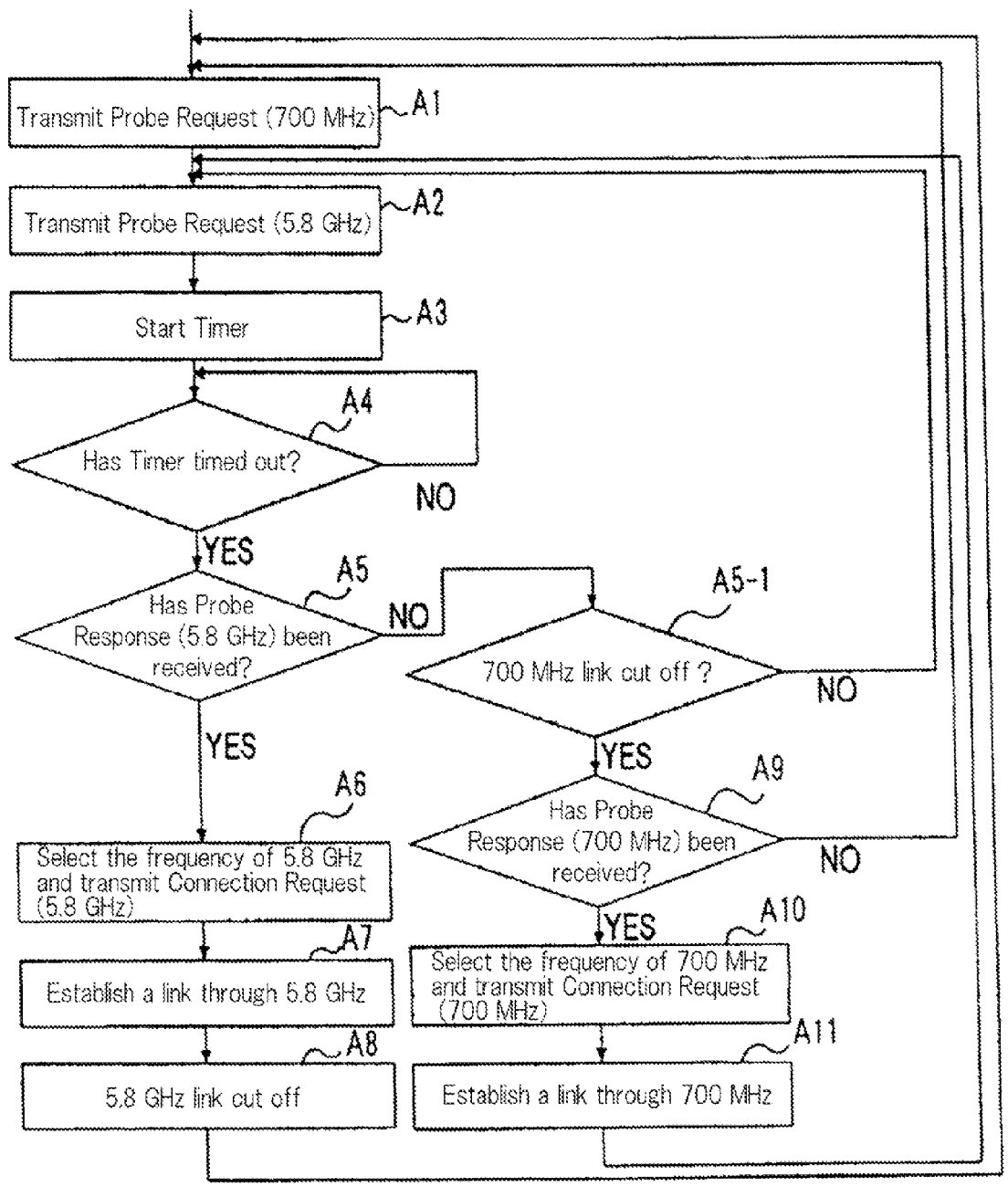
FIG. 4 is a flow chart showing another processing sequence of a sender terminal shown in FIG. 2.

FIG. 4 is a flow chart showing another processing sequence of the sender terminal shown in FIG. 2.

In the processing sequence shown in FIG. 3, even if, after having started communication with a receiver terminal using the first frequency band (5.8 GHz), the car equipped with the receiver terminal has moved to an area where the car is invisible, the sender terminal can continue communication with the receiver terminal using the second frequency band (700 MHz). However, if, after having started communication with a receiver terminal using the second frequency band, the car equipped with the receiver terminal has moved from the area where it is invisible from the car equipped with the sender terminal, to the area where it is visible, it is impossible to perform communication using the first frequency band.

FIG. 4 shows a processing sequence in which the first frequency band is used to re-establish the link when the car equipped with the receiver terminal has moved from the area where it is invisible to the area where it is visible.

FIG. 4 is the process of the flow chart shown in FIG. 3 to which Step A5-1 is added. When establishing the link with the receiver terminal using the second frequency band (700 MHz) at Step A11, the sender terminal transmits a probe request periodically using the first frequency band (5.8 GHz). In this case, since the link using the second frequency band has been already established, it is not necessary to transmit a probe request using the second frequency band. Accordingly, the sender terminal skips to Step A2 and transmits a probe request of the first frequency band only.

Then, similarly to the control shown in FIG. 3, the sender terminal starts a timer at Step A3. After the timer has timed out at Step A4, the sender terminal determines whether a probe response of the first frequency band has been received at Step A5.

When having received no probe response of the first frequency band, the sender terminal checks whether the link using the second frequency band is cut off (Step A5-1). If the link is not cut off, the control goes to Step A2 and repeats the same process. On the other hand, when the link using the second frequency band has been cut off, it is determined at Step A9 whether a probe response of the second frequency band has been received. When a probe response of the second frequency band has been received, the sender terminal selects the second frequency band at Step A10 and transmits a connection request using the second frequency band to establish the link with the receiver terminal (Step A11).

When having received a probe response of the first frequency band at Step A5, the sender terminal releases the link using the second frequency band and selects the first frequency band at Step A6, and transmits a connection request using the first frequency band to establish a link with the receiver terminal (Step A7).

Accordingly, it is possible to establish a link using the first frequency band even when the car that is equipped with the receiver terminal and that made communication using the second frequency band has moved from the area, where it is invisible to the car equipped with the sender terminal, to an area where it is visible.

Figure 5:
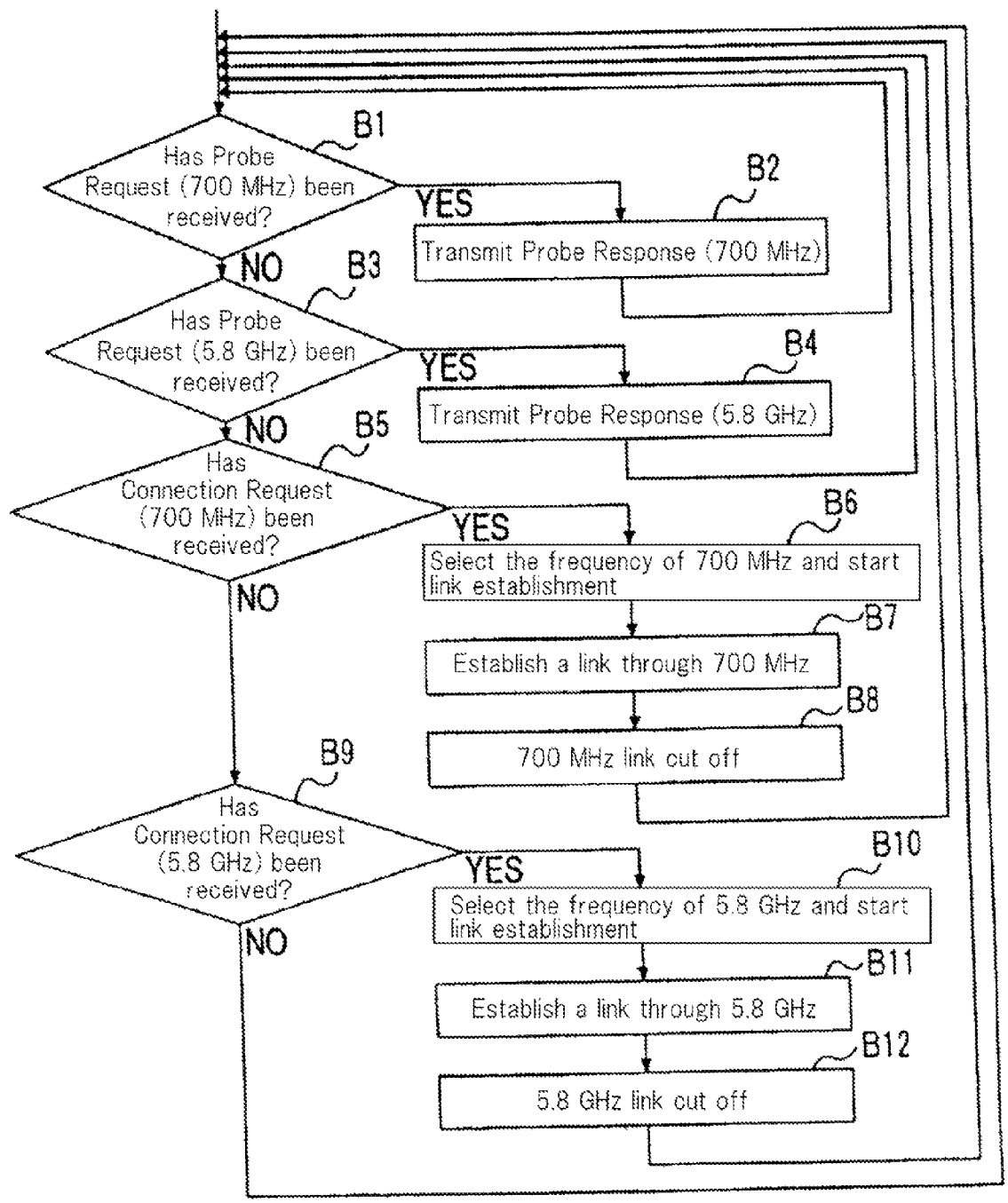
FIG. 5 is a flow chart showing the processing sequence of a receiver terminal shown in FIG. 2.

FIG. 5 is a flow chart showing the processing sequence of the receiver terminal shown in FIG. 2.

As shown in FIG. 5, at first the receiver terminal determines whether a probe request of the second frequency band (700 MHz) has been received (Step B1). When having received a probe request of the second frequency band, the receiver terminal returns a probe response using the second frequency band to the sender terminal (Step B2).

When having received no probe request of the second frequency band, the receiver terminal determines whether a probe request of the first frequency band (5.8 GHz) has been received (Step B3). When having received a probe request of the first frequency band, the receiver terminal returns a probe response using the first frequency band to the sender terminal (Step B4).

When having received no probe request of the first frequency band, the receiver terminal determines whether a connection request of the second frequency band has been received (Step B5). When having received a connection request of the second frequency band, the receiver terminal selects the second frequency band as the frequency band to be used for communication with the sender terminal (Step B6) and establishes a link with the sender terminal using the second frequency band (Step B7). If the link is cut off (Step B8), the control goes back to Step B1 and repeats the same procedures.

When having received no connection request of the second frequency band at Step B5, the receiver terminal determines whether a connection request of the first frequency band has been received (Step B9). When having received a connection request of the first frequency band, the received terminal selects the first frequency band as the frequency band to be used for communication with the sender terminal (Step B10) and establishes a link with the sender terminal using the first frequency band (Step B11). If the link is cut off (Step B12), the control goes back to Step B1 and repeats the same procedures.

In the processing sequence of the receiver terminal shown in FIG. 5, if none of the probe responses and connection requests of the first frequency band (5.8 GHz) and the second frequency band (700 MHz) are received, the receiver terminal will repeat process to determine whether a probe response or connection request is received, for the predetermined number of times. Then, when none of the probe responses and connection requests are received, the receiver terminal decides that the condition of the receiver terminal is such that it cannot communicate with the sender terminal.

When the link that was once established using the radio wave of the first frequency band or the second frequency band is cut off, the same processing sequence shown in FIG. 5 is repeated to try to establish a link once again.

Accordingly, if the car that is equipped with the sender terminal and that communicated using the first frequency band (5.8 GHz), moves to an area in which the car is invisible, it is possible to establish a link once again using the second frequency band.

Figure 6:
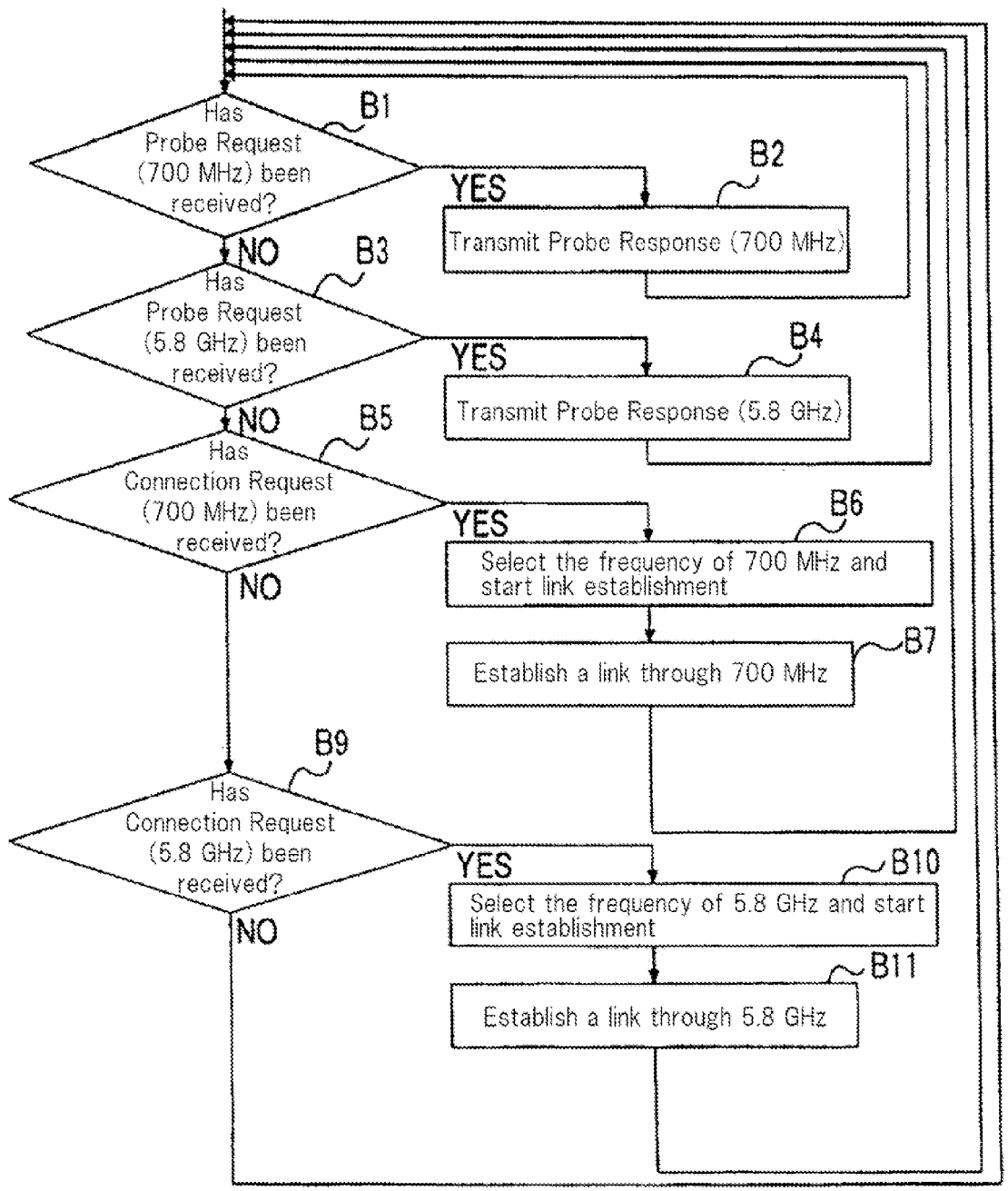
FIG. 6 is a flow chart showing another processing sequence of a receiver terminal shown in FIG. 2.

FIG. 6 is a flow chart showing another processing sequence of the receiver terminal shown in FIG. 2.

In the processing sequence shown in FIG. 5, even if, after having started communication with the sender terminal using the first frequency band (5.8 GHz) and if the car equipped with the sender terminal has moved to an area where the car is invisible to the car equipped with the sender terminal, the receiver terminal can continue communication with the sender terminal using the second frequency band (700 MHz).

However, if, after having started communication with the sender terminal using the second frequency band, and if the car equipped with the sender terminal has moved from an area where it is invisible to the car equipped with the receiver terminal, to the area where it is visible, it is impossible to perform communication using the first frequency band.

FIG. 6 shows a processing sequence in which the first frequency band is used to re-establish the link when the car equipped with the sender terminal has moved from the area where it is invisible to the car equipped with the receiver terminal, to an area where it is visible.

FIG. 6 is the process of the flow chart shown in FIG. 5 from which Step B1 and Step B11 are removed. After having established the link with the receiver terminal using the second frequency band (700 MHz) at Step B7, the control goes back to Step B1 and repeats the same procedures. After having established the link with the receiver terminal using the first frequency band (5.8 GHz) at Step B11, the control goes back to Step B1 and repeats the same procedures. That is, after establishment of a link with the receiver terminal using the second frequency band (700 MHz) or the first frequency band (5.8 GHz), the receiver terminal determines whether probe requests or connection requests of the first frequency band and the second frequency band have been received.

Then, after having received a probe request of the first frequency band (5.8 GHz) at Step B3, the receiver terminal returns a probe response of the first frequency band to the sender terminal at Step B4. After having received a connection request of the first frequency band (5.8 GHz) at Step B9, the receiver terminal selects the first frequency band at Step B10 and establishes a link using the first frequency band at Step B11.

Accordingly, even if, after starting communication with the sender terminal using the second frequency band, the car equipped with the sender terminal has moved from the area where the car is invisible to the car equipped with the receiver terminal, to an area where it, is visible, it is possible to establish a link once again, using the first frequency band.

The Second Exemplary Embodiment

Figure 7:
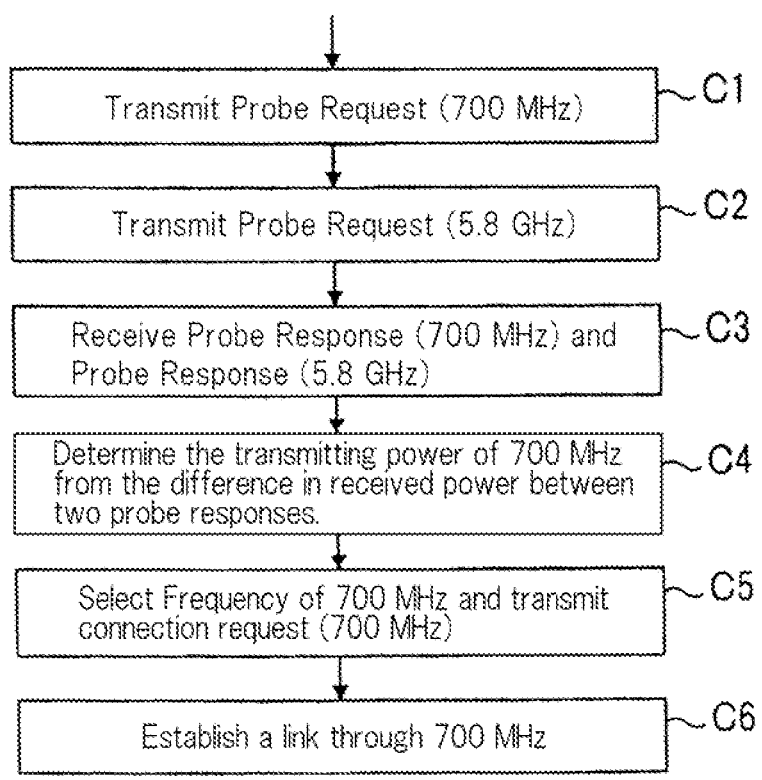
FIG. 7 is a flow chart showing the processing sequence of a sender terminal of the second exemplary embodiment.

FIG. 7 is a flow chart showing the processing sequence of a sender terminal of the second exemplary embodiment. Since the configuration of the terminal apparatus is the same as that of the first exemplary embodiment, description is omitted.

As described above, radio waves of relatively low frequency bands, as low as some hundreds MHz, can reach farther since the ratio of space attenuation is low. In other words, if radio waves of the first frequency band and the second frequency band are received at the same point, the received power of the radio wave of the second frequency band is greater than that of the radio wave of the first frequency band.

The processing sequence shown in FIG. 7 is an example in which when a receiver terminal exists at such a distance as to receive both the first frequency band and the second frequency band, not the first frequency band but the second frequency band is used to establish a link. In the present exemplary embodiment, the transmitting power of the second frequency band at the sender terminal is adjusted so that the received power of the first frequency band and the received power of second frequency band at the receiver terminal will take the same value.

In the processing sequence shown in FIG. 7, the sender terminal transmits a probe request using the second frequency band (700 MHz) (Step C1) and then transmits a probe request using the first frequency band (5.8 GHz)(Step C2).

When receiving both the probe responses to the probe requests of the first frequency band and the second frequency band (Step C3), the sender terminal calculates the difference in received power between the received two probe responses and sets the transmitting power of the second frequency band at the sender terminal so that the received power of the first frequency band and the received power of second frequency band at the receiver terminal will take the same value (Step C4).

When the sender terminal has selected the second frequency band as the frequency band to be used for communication with the received terminal, the sender terminal transmits a connection request of the second frequency band at the set transmitting power (Step C5) so as to establish a link with the receiver terminal (Step C6).

The above calculating process at Step C4 can be executed by received information processor 604 shown in FIG. 1 and the transmitting power of the second frequency band can be adjusted by power controller 607 shown in FIG. 1.

According to the second exemplary embodiment, the transmitting power for communication using the second frequency band at the sender terminal decreases. Accordingly, the power consumption of the terminal apparatus decreases. Further, reduction of the transmitting power of the second frequency band makes the communication area of the sender terminal narrow, thus the number of the communicable terminal apparatuses (receiver terminals) decreases. Accordingly, communications with terminal apparatuses set on cars other than the cars needing to be monitored, such as oncoming cars on a road with poor visibility, incoming cars entering a blind crossing, decrease, so that unnecessary information being provided to the user using ITS is avoided.

Though the present invention has been described referring to the exemplary embodiments, the present invention should not be limited to the above exemplary embodiments. In the configuration and details of the present invention, various modifications that will be understood to those skilled in the art can be made within the scope of the present invention.

The invention claimed is:

1. A radio communication method for transmitting and receiving data between at least two communication apparatuses capable of performing radio communication, wherein
a first communication apparatus, among the at least two communication apparatuses, transmits existence confirmation request notices to a second communication apparatus, among the at least two communication apparatuses, separately using a first frequency band and a second frequency band that is a frequency band different from the first frequency band,
the second communication apparatus returns existence confirmation response notices as a response to correctly received existence confirmation request notices of the first frequency band and the second frequency band, to the first communication apparatus, using the frequency bands corresponding to the first frequency band and the second frequency band, and,
the first communication apparatus, after having received one or more of the existence confirmation response notices transmitted from the second communication apparatus, exchanges data with the second communication apparatus, using the frequency band that corresponds to the existence confirmation response notice transmitted through higher frequency band among the first and second frequency bands,
wherein the first communication apparatus adjusts a transmitting power of a radio wave of the second frequency band such that a received power of a radio wave of the first frequency band and that of the radio wave of the second frequency band at the second communication apparatus will be equal to each other.

2. The radio communication method according to claim 1, wherein the first communication apparatus also transmits the existence confirmation request notice to the second communication apparatus at intervals of a predetermined period, using, at least, the first frequency band even while exchanging data with the second communication apparatus using the second frequency band.

3. The radio communication method according to claim 2, wherein the second communication apparatus determines whether, at least, the existence confirmation request notice of the first frequency band is received, at intervals of a predetermined period even while exchanging data with the first communication apparatus using the second frequency band.

4. The radio communication method according to claim 1, wherein the existence confirmation request notice represents a probe request and the existence confirmation response notice represents a probe response.

5. A radio communication system for transmitting and receiving data between at least two communication apparatuses capable of performing radio communication, comprising:
a first communication apparatus, among the at least two communication apparatuses, that transmits existence confirmation request notices, separately using a first frequency band and a second frequency band that is a frequency band different from the first frequency band and that, after having received one or more of the existence confirmation response notices that respond to the existence confirmation request notices of the first frequency band and the second frequency band, transmits and receives data, using a frequency band corresponding to the higher frequency band of the first and second frequency bands; and, a second communication apparatus, among the at least two communication apparatuses, that, after having correctly received one or more of the existence request notices of the first frequency band and the second frequency band, returns existence confirmation response notices in response to the correctly received existence confirmation request notices, to the first communication apparatus, using the frequencies corresponding to the first frequency band and the second frequency band, wherein the first communication apparatus adjusts a transmitting power of a radio wave of the second frequency band such that a received power of the radio wave of the first frequency band and that of the radio wave of the second frequency band at the second communication apparatus will be equal to each other.

6. The radio communication system according to claim 5, wherein the first communication apparatus transmits the existence confirmation request notice to the second communication apparatus at intervals of a predetermined period, using the first frequency band even while exchanging data with the second communication apparatus using the second frequency band.

7. The radio communication system according to claim 6, wherein the second communication apparatus determines whether the existence confirmation request notice of the first frequency band is received at intervals of a predetermined period even while exchanging data with the first communication apparatus using the second frequency band.

8. The radio communication system according to claim 5, wherein the existence confirmation request notice represents a probe request and the existence confirmation response notice represents a probe response.

* * * * *